United States Patent
Hu et al.

(10) Patent No.: US 12,549,320 B2
(45) Date of Patent: Feb. 10, 2026

(54) CHANNELIZATION OF 60GHz BAND FOR NEXT-GENERATION WLAN

(71) Applicant: MediaTek Inc., Hsinchu (TW)

(72) Inventors: Shengquan Hu, San Jose, CA (US); Jianhan Liu, San Jose, CA (US); Thomas Edward Pare, Jr., San Jose, CA (US)

(73) Assignee: MediaTek Inc. (TW)

( * ) Notice: Subject to any disclaimer, the term of this patent is extended or adjusted under 35 U.S.C. 154(b) by 214 days.

(21) Appl. No.: 18/118,310

(22) Filed: Mar. 7, 2023

(65) Prior Publication Data

US 2023/0299931 A1  Sep. 21, 2023

Related U.S. Application Data

(60) Provisional application No. 63/330,334, filed on Apr. 13, 2022, provisional application No. 63/321,333, filed on Mar. 18, 2022.

(51) Int. Cl.
*H04L 5/00* (2006.01)
*H04W 84/12* (2009.01)

(52) U.S. Cl.
CPC .......... *H04L 5/0094* (2013.01); *H04W 84/12* (2013.01)

(58) Field of Classification Search
CPC ....... H04L 5/003; H04L 5/0094; H04W 84/12
See application file for complete search history.

(56) References Cited

U.S. PATENT DOCUMENTS

| | | | |
|---|---|---|---|
| 10,447,448 B2 * | 10/2019 | Park | H04L 27/26 |
| 10,791,545 B2 * | 9/2020 | Bang | H04L 5/0092 |
| 2003/0171115 A1 | 9/2003 | Batra et al. | |
| 2016/0021568 A1 | 1/2016 | Yu et al. | |
| 2016/0198345 A1 | 7/2016 | Fan et al. | |
| 2016/0323890 A1 | 11/2016 | Cordeiro | |
| 2017/0070995 A1 | 3/2017 | Eitan et al. | |

(Continued)

FOREIGN PATENT DOCUMENTS

| | | |
|---|---|---|
| CN | 103118432 A | 5/2013 |
| CN | 107925550 A | 4/2018 |

(Continued)

OTHER PUBLICATIONS

IEEE Std. 802.11ay-2021 "Part 11: Wireless LAN Medium Access Control (MAC) and Physical Layer (PHY) Specifications Amendment 2: Enhanced Throughput for Operations in License-exempt Bands above 45 GHz"; IEEE Computer Society. Jul. 28, 2021 (Year: 2021).*

(Continued)

*Primary Examiner* — Stephen J Clawson
(74) *Attorney, Agent, or Firm* — Andy M. Han; Han IP PLLC

(57) ABSTRACT

Techniques pertaining to designs of channelization of the 60 GHz band for next-generation wireless local area networks (WLANs) are described. A first apparatus communicates in a 60 GHz band wirelessly with a second apparatus by communicating with a channelization design of the 60 GHz band having a channel center frequency being equal to (a channel starting frequency+$\Delta F$)+$\Delta F$*channelIndex, with $\Delta F$ denoting a half of a channel spacing and with channelIndex denoting a channel index value.

17 Claims, 14 Drawing Sheets

(56) References Cited

U.S. PATENT DOCUMENTS

| | | |
|---|---|---|
| 2017/0180174 A1 | 6/2017 | Park et al. |
| 2017/0338927 A1 | 11/2017 | Park et al. |
| 2017/0338928 A1 | 11/2017 | Park et al. |
| 2018/0254805 A1* | 9/2018 | Sadri .................. H01Q 5/28 |
| 2018/0352445 A1 | 12/2018 | Khan |
| 2019/0052395 A1* | 2/2019 | Motozuka ............ H04L 1/1614 |
| 2019/0191414 A1* | 6/2019 | Bang .................... H04W 84/12 |
| 2019/0208463 A1 | 7/2019 | Lou et al. |
| 2019/0268972 A1* | 8/2019 | Chen .................... H04L 1/0003 |
| 2021/0359885 A1 | 11/2021 | Shellhammer et al. |
| 2023/0247603 A1* | 8/2023 | Cariou ................ H04L 27/2601 |
| | | 370/329 |
| 2023/0300011 A1* | 9/2023 | Hu ...................... H04L 5/0094 |
| | | 370/338 |
| 2023/0319874 A1* | 10/2023 | Myung ............ H04W 72/0457 |
| | | 370/329 |
| 2024/0179737 A1* | 5/2024 | Tsai .................... H04L 27/0006 |

FOREIGN PATENT DOCUMENTS

| | | |
|---|---|---|
| CN | 110999508 A | 4/2020 |
| CN | 111066361 A | 4/2020 |
| CN | 114189850 A | 3/2022 |
| WO | WO 2016176097 A1 | 11/2016 |
| WO | WO 2022011000 A1 | 1/2022 |

OTHER PUBLICATIONS

Taiwan Intellectual Property Office, Office Action in Taiwan Patent Application No. 112109991, Jul. 31, 2023.
European Patent Office, Extended European Search Report in European Patent Application No. 23162105.3, Aug. 11, 2023.
Taiwan Intellectual Property Office, Office Action in Taiwan Patent Application No. 112109990, Jul. 31, 2023.
European Patent Office, Extended European Search Report in European Patent Application No. 23162055.0, Aug. 11, 2023.
Laurent Cariou (Intel): "Bandwidth signaling for EDMG; 11-16-0954-00-00ay-bandwidth-signaling-for-edmg", IEEE Draft; 11-16-0954-00-00AY-Bandwidth-Signaling-For-EDMG, IEEE-SA Mentor, Piscataway, NJ USA, vol. 802.11ay, Jul. 28, 2016, XP068107310.
USPTO, Office Action dated Jul. 11, 2025 in U.S. Appl. No. 18/118,368.
IEEE: "Part 11: Wireless LAN Medium Access Control (MAC) and Physical Layer (PHY) Specifications; Amendment 2: Enhanced Throughput for Operations in License-exempt Bands above 45 GHz", Mar. 25, 2021.

* cited by examiner

1400

COMMUNICATE, BY A PROCESSOR OF A FIRST APPARATUS, IN A 60GHz BAND WIRELESSLY WITH A SECOND APPARATUS WITH A CHANNELIZATION DESIGN OF THE 60GHz BAND HAVING A CHANNEL CENTER FREQUENCY BEING EQUAL TO (A CHANNEL STARTING FREQUENCY + $\Delta F$) + $\Delta F$ * $CHANNELINDEX$

- $\Delta F$ DENOTES A HALF OF A CHANNEL SPACING, AND
- $CHANNELINDEX$ DENOTES A CHANNEL INDEX VALUE

1410

TRANSMIT FIRST DATA OR FIRST INFORMATION TO THE SECOND APPARATUS

1412

RECEIVE SECOND DATA OR SECOND INFORMATION FROM THE SECOND APPARATUS

CHANNELIZATION OF 60GHz BAND FOR NEXT-GENERATION WLAN

CROSS REFERENCE TO RELATED PATENT APPLICATION

The present disclosure is part of a non-provisional patent application claiming the priority benefit of U.S. Provisional Patent Application Nos. 63/321,333, filed 18 Mar. 2022, and 63/330,334, filed 13 Apr. 2022, the contents of which herein being incorporated by reference in their entirety.

TECHNICAL FIELD

The present disclosure is generally related to wireless communications and, more particularly, to designs of channelization of a 60 GHz band for next-generation wireless local area networks (WLANs).

BACKGROUND

Unless otherwise indicated herein, approaches described in this section are not prior art to the claims listed below and are not admitted as prior art by inclusion in this section.

In wireless communications such as Wi-Fi (or WiFi), the 60 GHz band has been used and standardized in Institute of Electrical and Electronics Engineers (IEEE) 802.11ad/ay directional multi-gigabit (DMG) and enhanced directional multi-gigabit (EDMG) systems to achieve higher throughput by utilizing the wide bandwidth of 60 GHz. On the other hand, metaverse type of applications, such as augmented reality (AR) and virtual reality (VR) applications and the like, typically require a high data rate with low latency. To meet the high data rate and low latency requirements for emerging metaverse type of applications, the 60 GHz millimeter wave (mmWave) band has been considered as one of potential technologies for next-generation wireless connectivity. In that regard, designs of the channelization of the 60 GHz band remains to be defined at the present time. Therefore, there is a need for a solution of designs of channelization of the 60 GHz band for next-generation WLANs.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to designs of channelization of the 60 GHz band for next-generation WLANs. For instance, under certain proposed schemes in accordance with the present disclosure, several different channelization design options may align with the IEEE 802.11ad/ay channel allocations. Alternatively, or additionally, under certain other proposed schemes in accordance with the present disclosure, most legacy IEEE 802.11ac/ax/be system designs, such as tone plan and modulation and coding scheme (MCS), may be reused in the designs of channelization of the 60 GHz band for next-generation WLANs.

In one aspect, a method may involve a processor of a first apparatus communicating in a 60 GHz band wirelessly with a second apparatus by either or both: (a) transmitting first data or first information to the second apparatus; and (b) receiving second data or second information from the second apparatus. In communicating in the 60 GHz band wirelessly, the method may involve the processor communicating with a channelization design of the 60 GHz band having a channel center frequency being equal to (a channel starting frequency+$\Delta F$)+$\Delta F$*channelIndex, with $\Delta F$ denoting a half of a channel spacing and with channelIndex denoting a channel index value.

In another aspect, an apparatus may include a transceiver configured to communicate wirelessly and a processor coupled to the transceiver. The processor may communicate, via the transceiver, in a 60 GHz band wirelessly with one other apparatus by either or both: (a) transmitting first data or first information to the other apparatus; and (b) receiving second data or second information from the other apparatus. In communicating in the 60 GHz band wirelessly, the processor may be configured to communicate with a channelization design of the 60 GHz band having a channel center frequency being equal to (a channel starting frequency+$\Delta F$)+$\Delta F$*channelIndex, with $\Delta F$ denoting a half of a channel spacing and with channelIndex denoting a channel index value.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 14 is a flowchart of an example process in accordance with an implementation of the present disclosure.

DETAILED DESCRIPTION OF PREFERRED EMBODIMENTS

Figure 1:
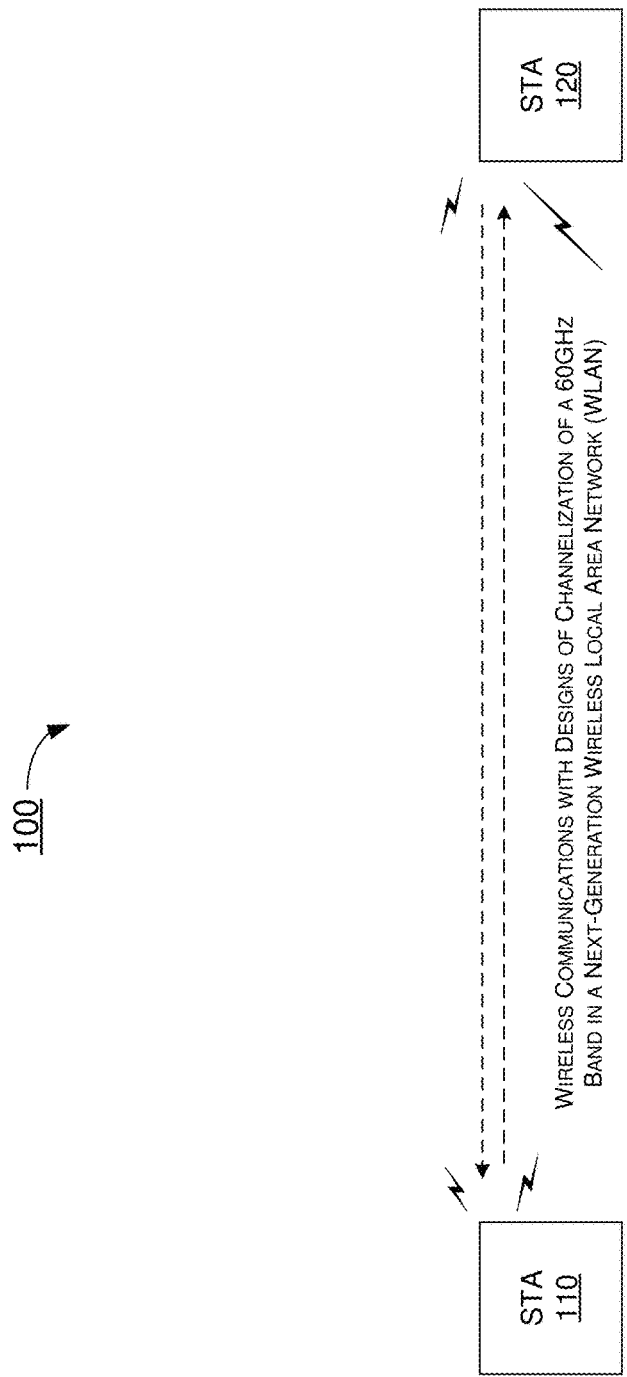
FIG. 1 is a diagram of an example network environment in which various solutions and schemes in accordance with the present disclosure may be implemented.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to designs of channelization of the 60 GHz band for next-generation WLANs. According to the present disclosure, a number of possible solutions may be implemented separately or jointly. That is, although these possible solutions may be described below separately, two or more of these possible solutions may be implemented in one combination or another.

It is noteworthy that, in the present disclosure, a regular RU (rRU) refers to a RU with tones that are continuous (e.g., adjacent to one another) and not interleaved, interlaced or otherwise distributed. Moreover, a 26-tone regular RU may be interchangeably denoted as RU26 (or rRU26), a 52-tone regular RU may be interchangeably denoted as RU52 (or rRU52), a 106-tone regular RU may be interchangeably denoted as RU106 (or rRU106), a 242-tone regular RU may be interchangeably denoted as RU242 (or rRU242), and so on. Moreover, an aggregate (26+52)-tone regular multi-RU (MRU) may be interchangeably denoted as MRU78 (or rMRU78), an aggregate (26+106)-tone regular MRU may be interchangeably denoted as MRU132 (or rMRU132), and so on.

Since the above examples are merely illustrative examples and not an exhaustive listing of all possibilities, the same applies to regular RUs, distributed-tone RUs, MRUs, and distributed-tone MRUs of different sizes (or different number of tones). It is also noteworthy that, in the present disclosure, a bandwidth of 20 MHz may be interchangeably denoted as BW20 or BW20M, a bandwidth of 40 MHz may be interchangeably denoted as BW40 or BW40M, a bandwidth of 80 MHz may be interchangeably denoted as BW80 or BW80M, a bandwidth of 160 MHz may be interchangeably denoted as BW160 or BW160M, a bandwidth of 240 MHz may be interchangeably denoted as BW240 or BW240M, and a bandwidth of 320 MHz may be interchangeably denoted as BW320 or BW320M, and a bandwidth of 480 MHz may be interchangeably denoted as BW480 or BW480M, and a bandwidth of 500 MHz may be interchangeably denoted as BW500 or BW500M, and a bandwidth of 520 MHz may be interchangeably denoted as BW520 or BW520M, and a bandwidth of 540 MHz may be interchangeably denoted as BW540 or BW540M, and a bandwidth of 640 MHz may be interchangeably denoted as BW640 or BW640M, and a bandwidth of 960 MHz may be interchangeably denoted as BW960 or BW960M, and a bandwidth of 1000 MHz may be interchangeably denoted as BW1000 or BW1000M, and a bandwidth of 1080 MHz may be interchangeably denoted as BW1080 or BW1080M, and a bandwidth of 1280 MHz may be interchangeably denoted as BW1280 or BW1280M, and a bandwidth of 2160 MHz may be interchangeably denoted as BW2160 or BW2160M, and a bandwidth of 2560 MHz may be interchangeably denoted as BW2560 or BW2560M, and a bandwidth of 1600 MHz may be interchangeably denoted as BW1600 or BW1600M, and a bandwidth of 1920 MHz may be interchangeably denoted as BW1920 or BW1920M, and a bandwidth of 2000 MHz may be interchangeably denoted as BW2000 or BW2000M, and a bandwidth of 3840 MHz may be interchangeably denoted as BW3840 or BW3840M, and a bandwidth of 5120 MHz may be interchangeably denoted as BW5120 or BW5120M.

FIG. 1 illustrates an example network environment 100 in which various solutions and schemes in accordance with the present disclosure may be implemented. FIG. 2~FIG. 14 illustrate examples of implementation of various proposed schemes in network environment 100 in accordance with the present disclosure. The following description of various proposed schemes is provided with reference to FIG. 1~FIG. 14.

Referring to FIG. 1, network environment 100 may involve at least a station (STA) 110 communicating wirelessly with a STA 120. Each of STA 110 and STA 120 may be a non-access point (non-AP) STA or, alternatively, either of STA 110 and STA 120 may function as an access point (AP) STA. In some cases, STA 110 and STA 120 may be associated with a basic service set (BSS) in accordance with one or more IEEE 802.11 standards (e.g., IEEE 802.11be and future-developed standards). Each of STA 110 and STA 120 may be configured to communicate with each other by utilizing the designs of channelization of the 60 GHz band for next-generation WLANs in accordance with various proposed schemes described below. That is, either or both of STA 110 and STA 120 may function as a "user" in the proposed schemes and examples described below. It is noteworthy that, while the various proposed schemes may be individually or separately described below, in actual implementations some or all of the proposed schemes may be utilized or otherwise implemented jointly. Of course, each of the proposed schemes may be utilized or otherwise implemented individually or separately.

It is noteworthy that, in channelization as specified in the IEEE 802.11ad standard, channel center frequency=channel starting frequency+channel spacing×channel number. The channel starting frequency is 56.16 GHz, the channel spacing is 2.16 GHz, and the channel number=1, 2, 3, 4. Moreover, in channelization as specified in the IEEE 802.11ay standard, the center frequency for a channel containing a primary 2.16 GHz channel is defined as: channel center frequency( )[GHz]=(channel starting frequency+ΔF)+ΔF×dot11EDMGCurrentChannelCenterFrequencyIndex( ). Under IEEE 802.11ay, the channel starting frequency is 56.16 GHz, ΔF is half of channel spacing and ΔF=1.08 GHz, and the channel index value=0, 1, 2, 3, . . . , 16.

Under various proposed schemes in accordance with the present disclosure, channelization of 60 GHz for next-generation WLANs may be aligned with existing IEEE 802.11ad/ay channelization. For instance, all the channels with a bandwidth ≤2.16 GHz may be within a 2.16 GHz channel range of IEEE 802.11ad/ay. Additionally, all the channels with a bandwidth ≤4.32 GHz may be within a 4.32 GHz channel range of IEEE 802.11ad/ay. Moreover, all the channels with a bandwidth ≤6.48 GHz may be within a 6.48 GHz channel range of IEEE 802.11ad/ay. Furthermore, all the channels with a bandwidth ≤8.64 GHz may be within an 8.64 GHz channel range of IEEE 802.11ad/ay. Under the proposed schemes, other than channel spacing=2.16 GHz used in IEEE 802.11ad/ay, several channel spacing options are proposed to support different bandwidth sizes. The channel spacing options may include, for example and without limitation, 2.16 GHz, 1.08 GHz, 0.72 GHz, 0.54 GHz, 0.36 GHz, 0.27 GHz, 0.24 GHz and 0.18 GHz. Also, as in IEEE 802.11ay EDMG, ΔF may be defined to denote one half of a given channel spacing under various proposed schemes in accordance with the present disclosure.

Under a proposed scheme in accordance with the present disclosure with respect to a design of channelization of the 60 GHz band for next-generation Wi-Fi, the channel center frequency (in GHz) may be defined as follows: channel center frequency [GHz]=(channel starting frequency+ΔF)+ΔF×channelIndex. Here, channel starting frequency=56.16 GHz, ΔF is half of channel spacing (e.g., ΔF=channel spacing/2), and channelIndex denotes a channel index value. For channel spacing=2.16 GHz, channel index=0, 1, 2, . . . , 16. For channel spacing=1.08 GHz, channel index=0, 1, 2, . . . , 32. For channel spacing=0.72 GHz, channel index=0, 1, 2, . . . , 48. For channel spacing=0.54 GHz, channel index=0, 1, 2, . . . , 64. For channel spacing=0.36 GHz, channel index=0, 1, 2, . . . , 96. For channel spacing=0.27 GHz, channel index=0, 1, 2, . . . , 128. For channel spacing=0.24 GHz, channel index=0, 1, 2, . . . , 144.

Figure 2:
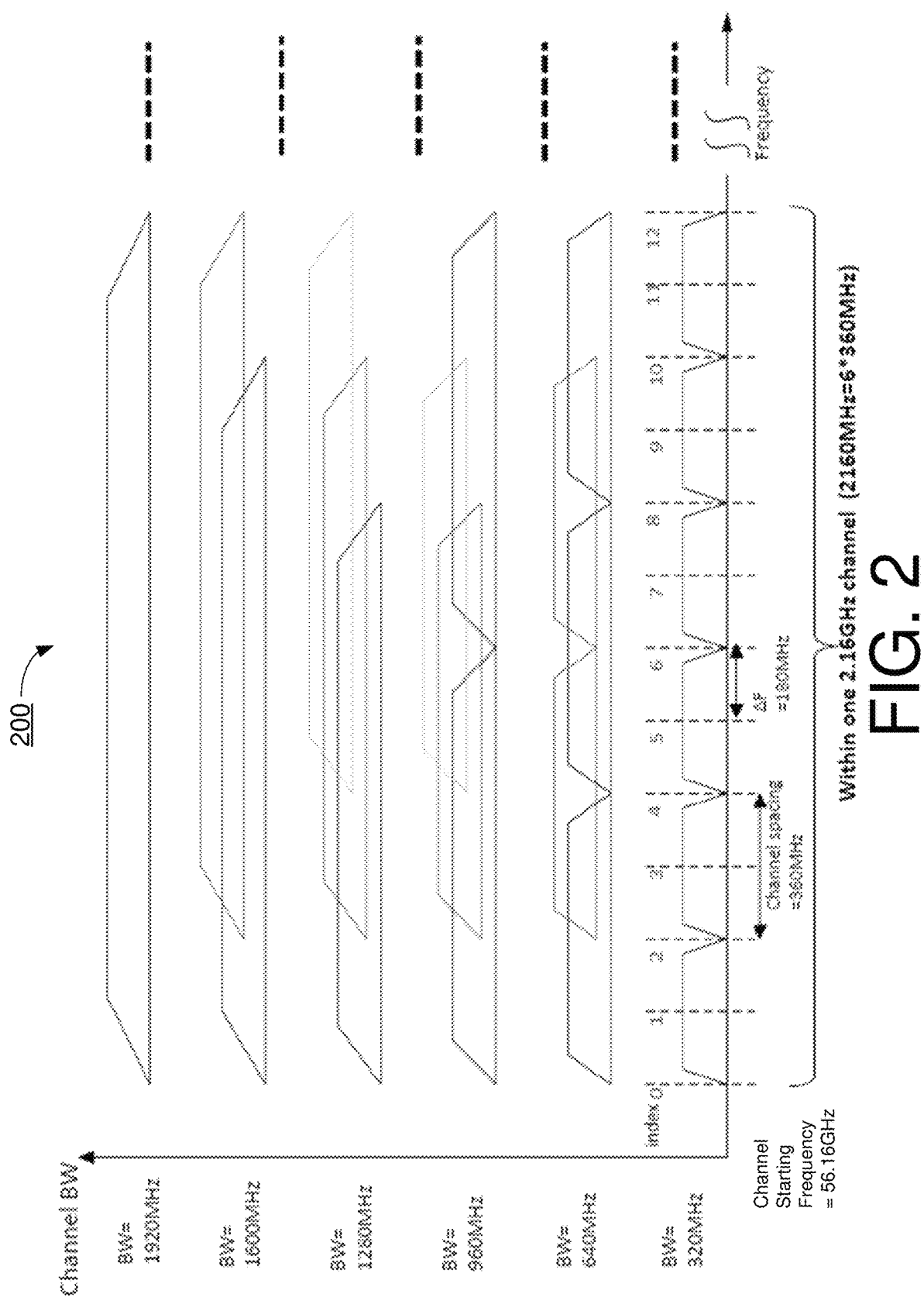
FIG. 2 is a diagram of an example design under a proposed scheme in accordance with the present disclosure.
Figure 3:
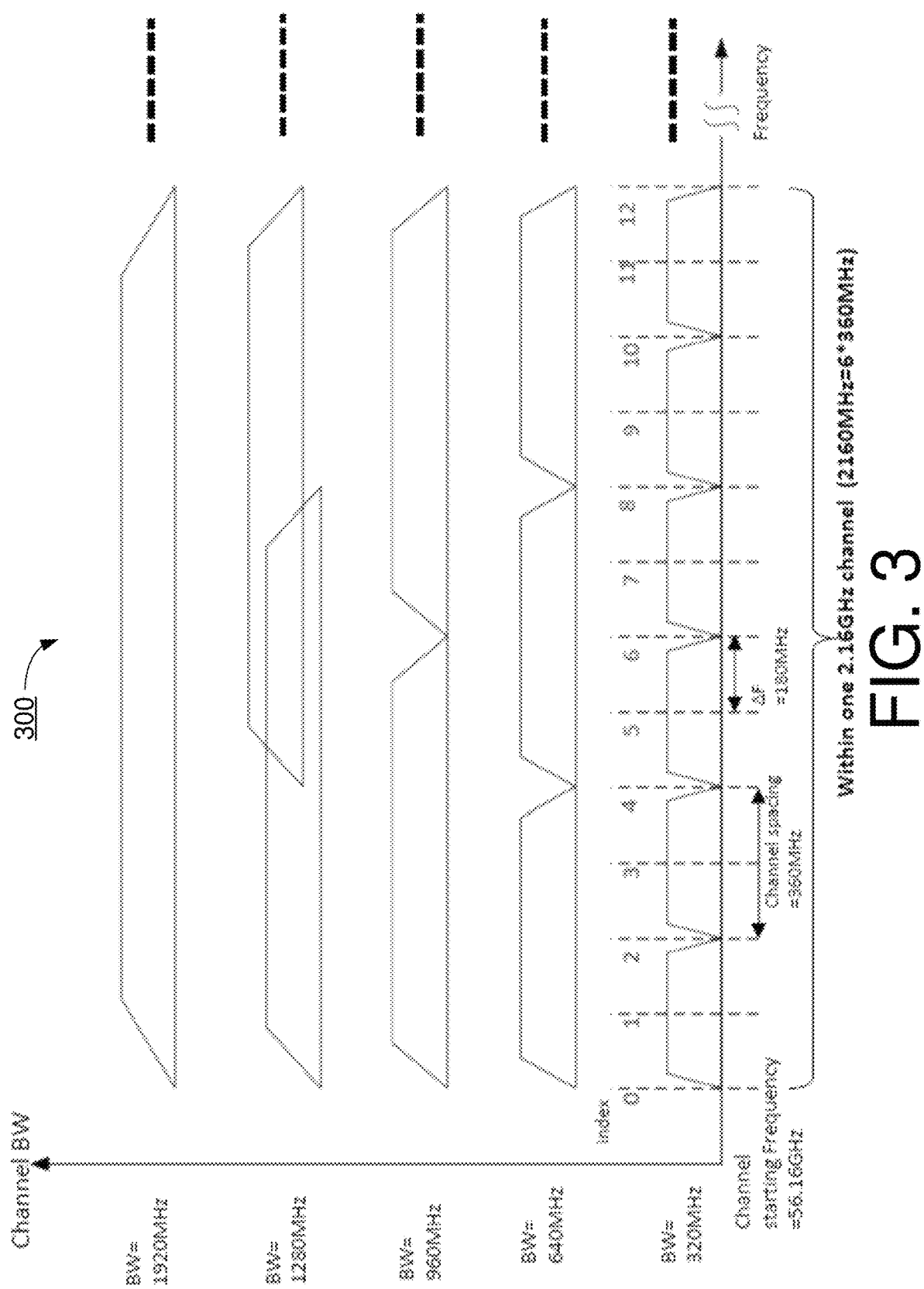
FIG. 3 is a diagram of an example design under a proposed scheme in accordance with the present disclosure.
Figure 4:
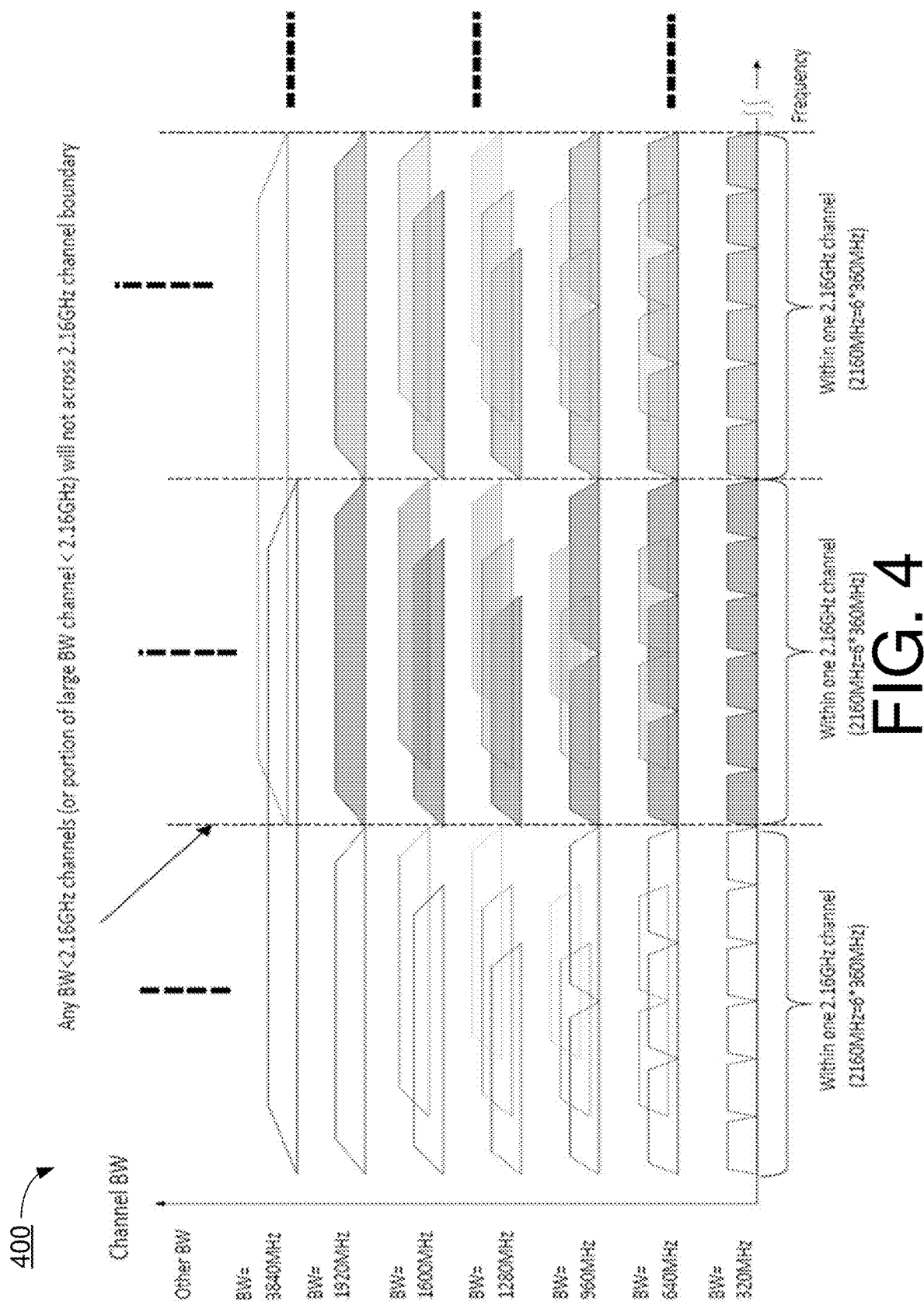
FIG. 4 is a diagram of an example design under a proposed scheme in accordance with the present disclosure.
Figure 5:
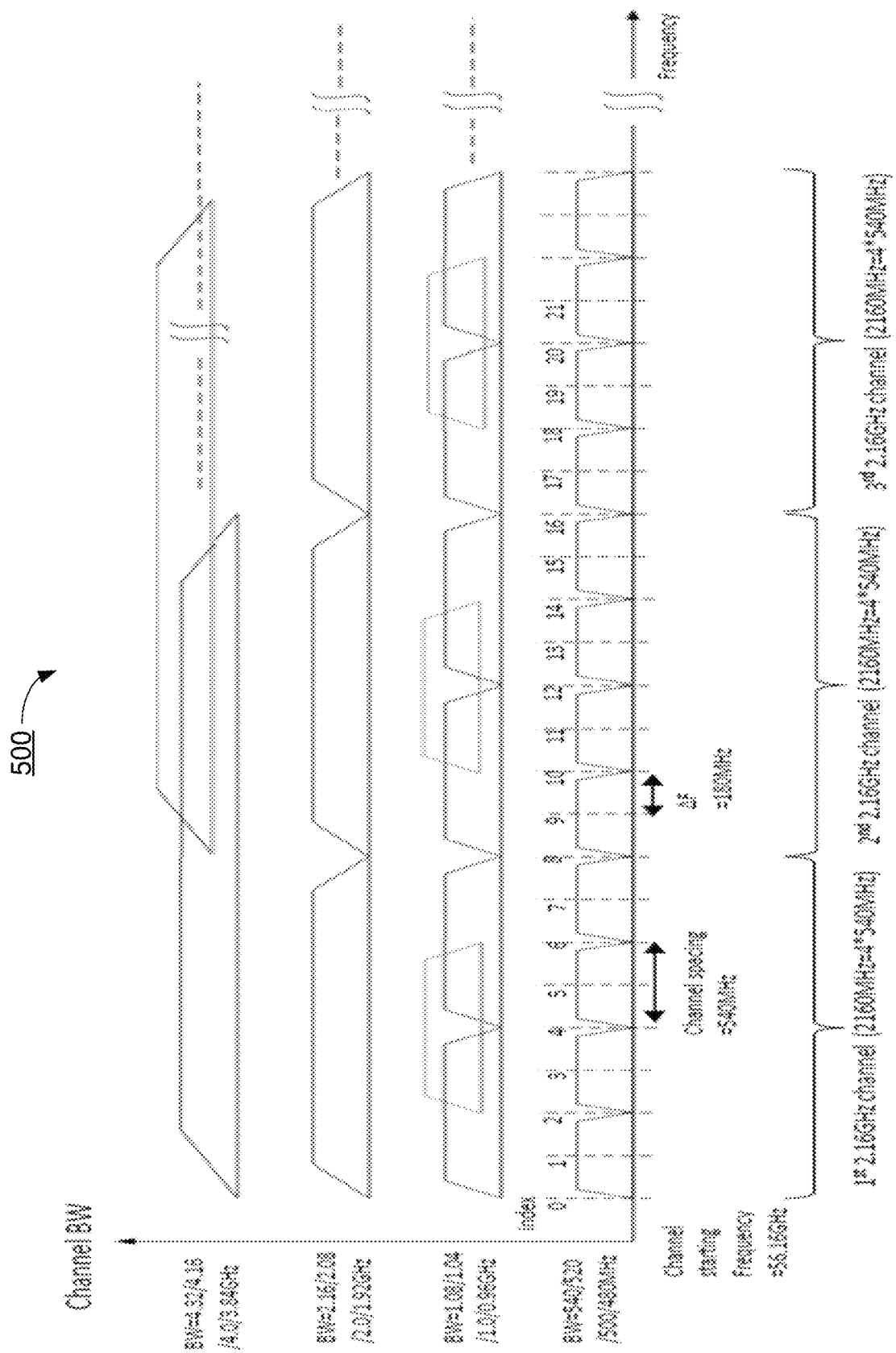
FIG. 5 is a diagram of an example design under a proposed scheme in accordance with the present disclosure.
Figure 6:
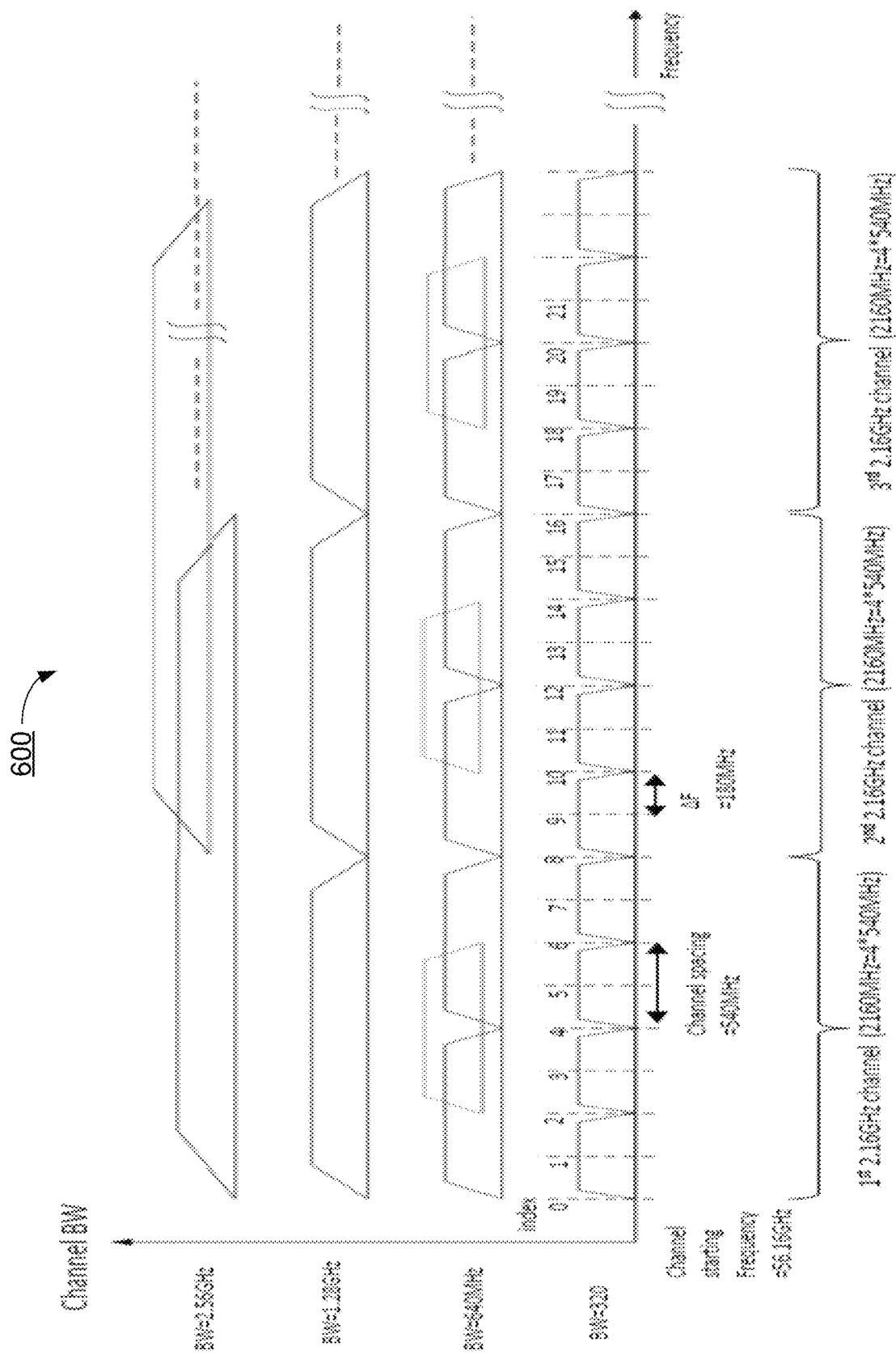
FIG. 6 is a diagram of an example design under a proposed scheme in accordance with the present disclosure.
Figure 7:
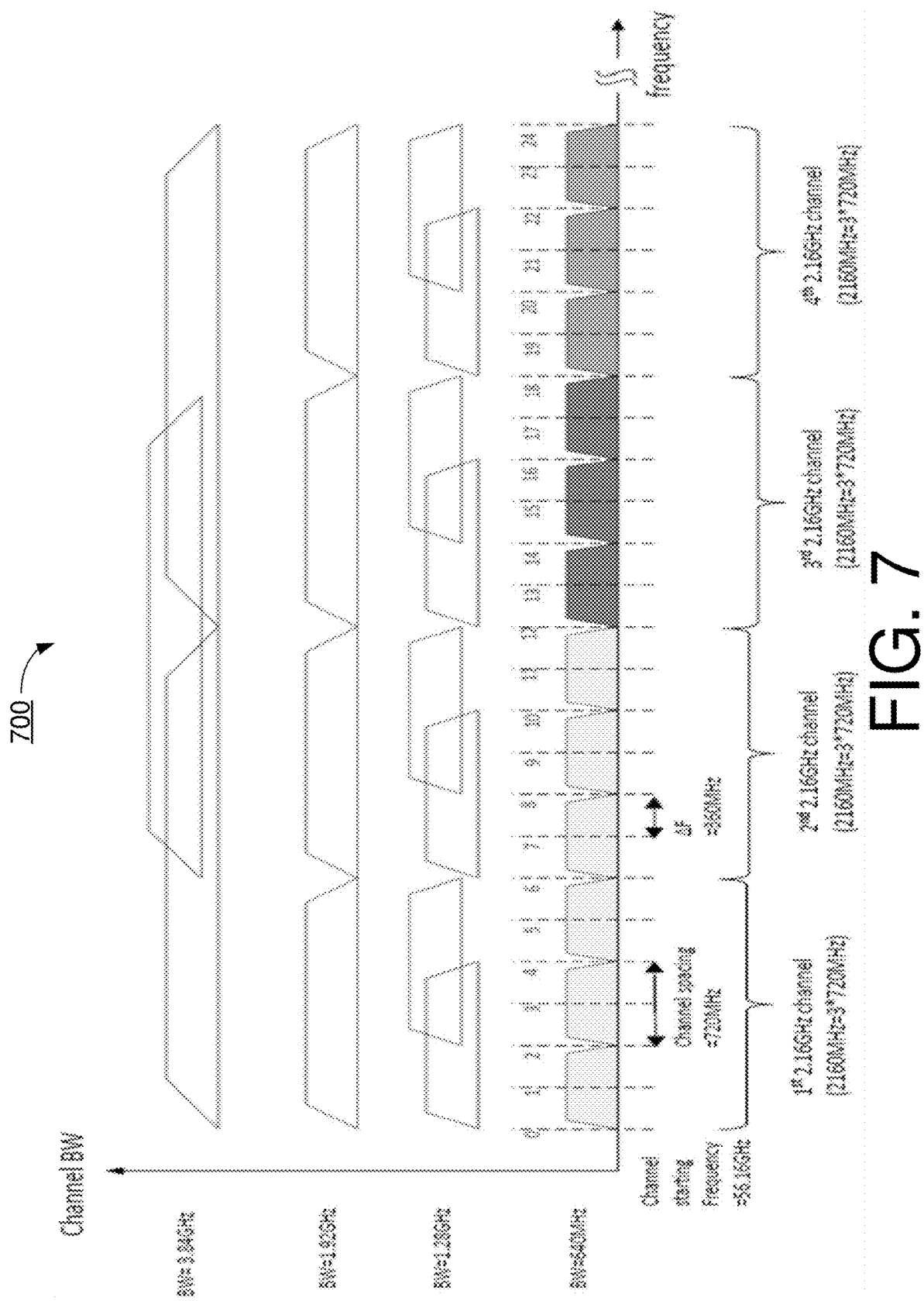
FIG. 7 is a diagram of an example design under a proposed scheme in accordance with the present disclosure.
Figure 8:
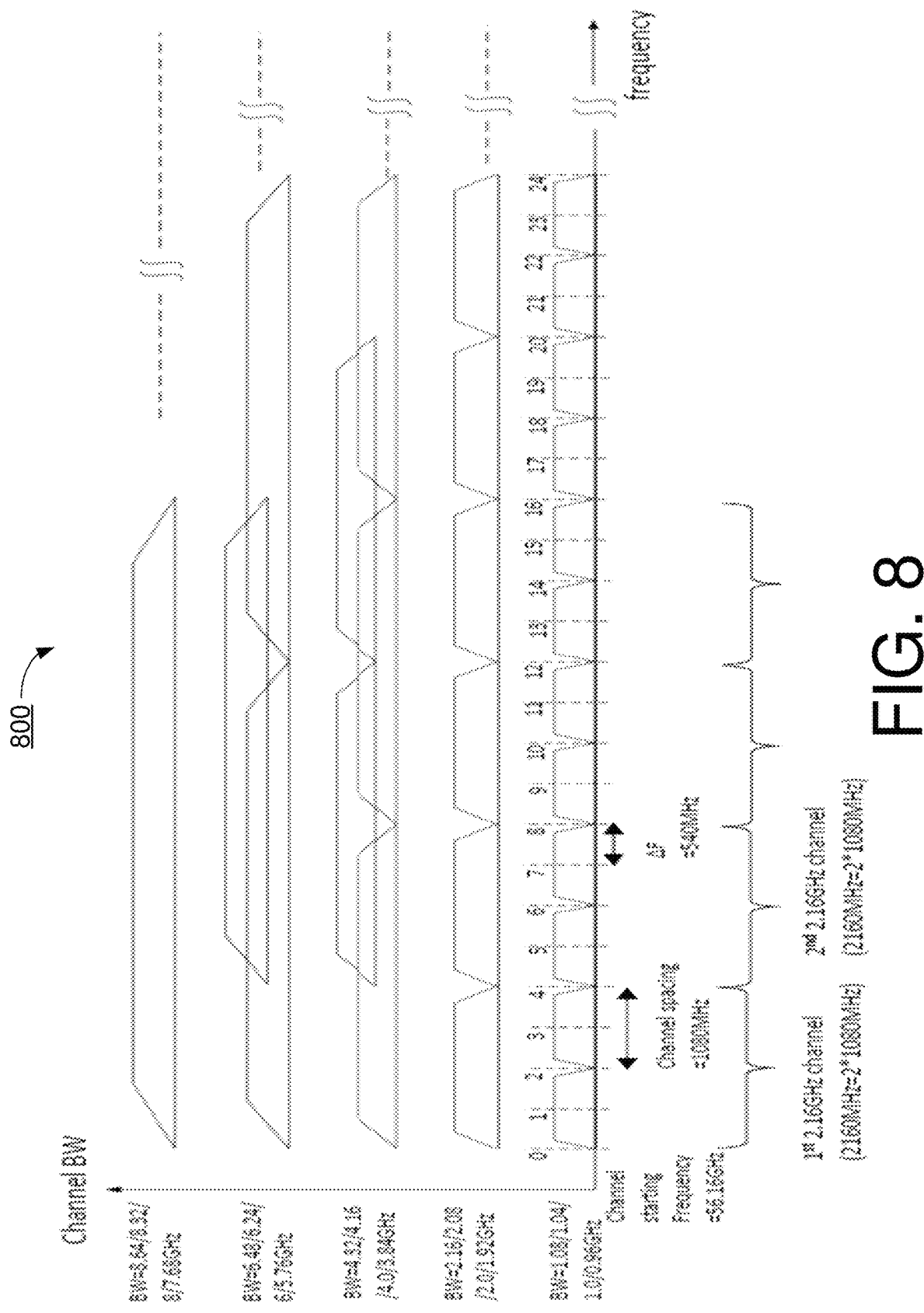
FIG. 8 is a diagram of an example design under a proposed scheme in accordance with the present disclosure.
Figure 9:
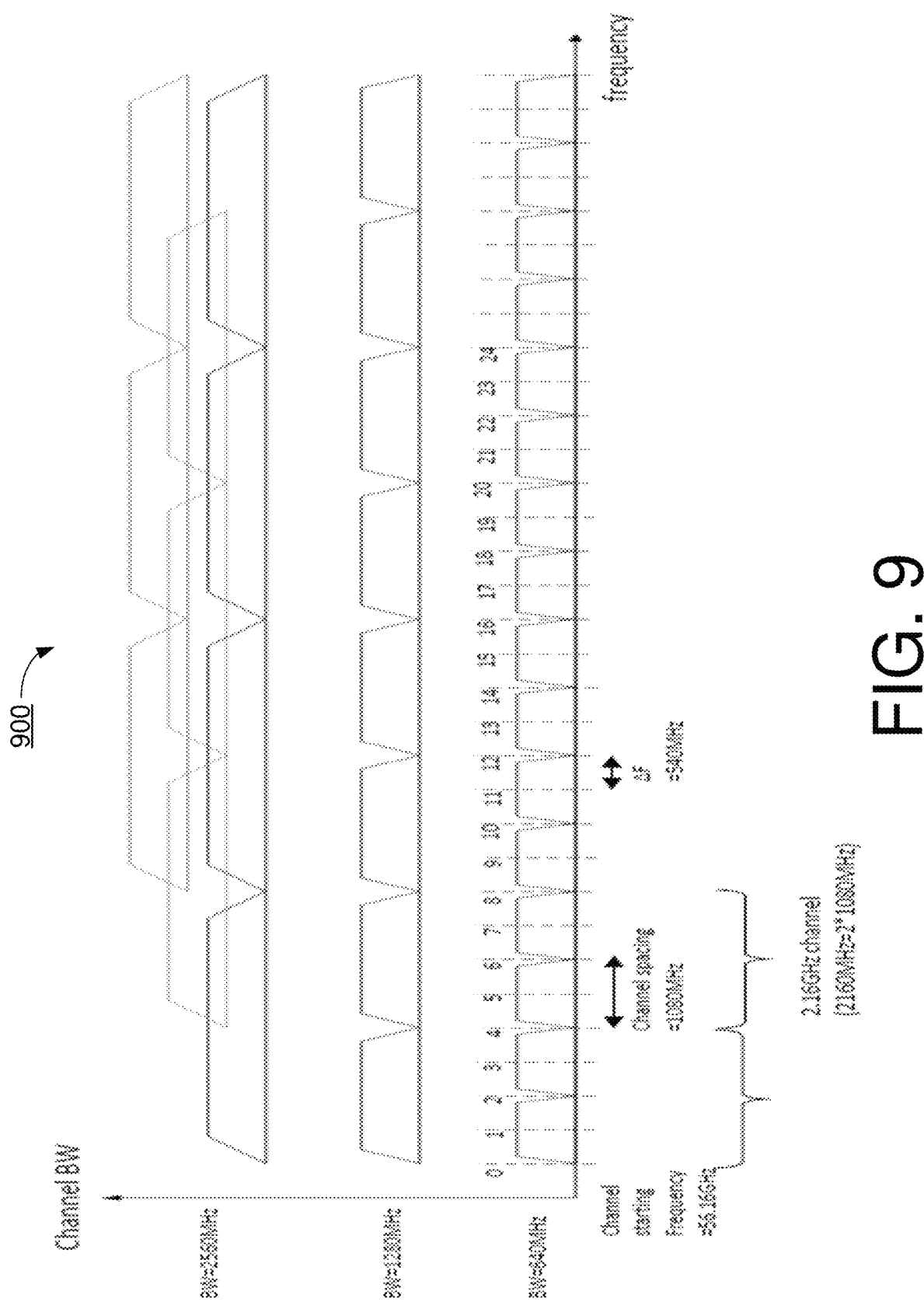
FIG. 9 is a diagram of an example design under a proposed scheme in accordance with the present disclosure.
Figure 10:
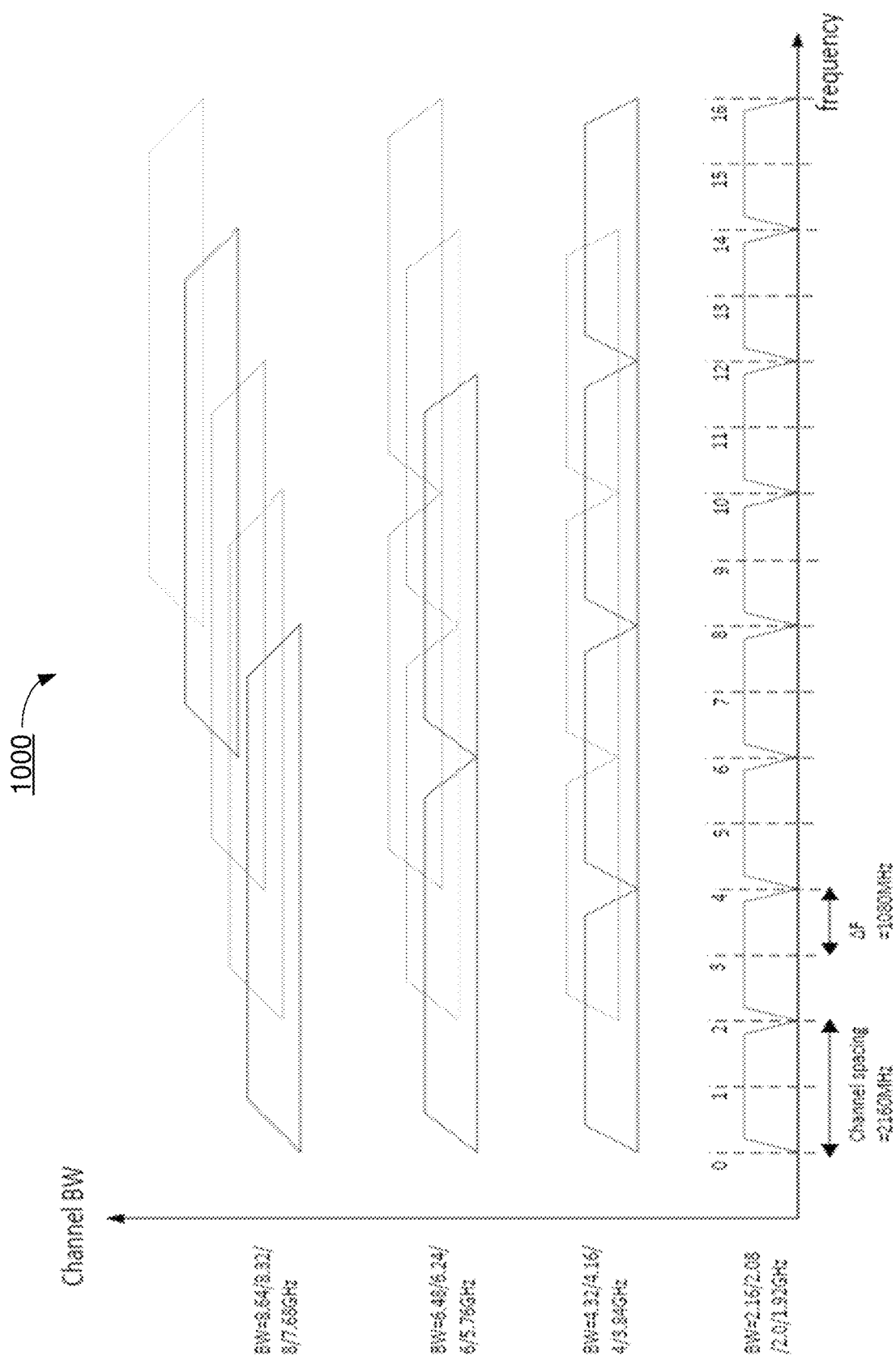
FIG. 10 is a diagram of an example design under a proposed scheme in accordance with the present disclosure.
Figure 11:
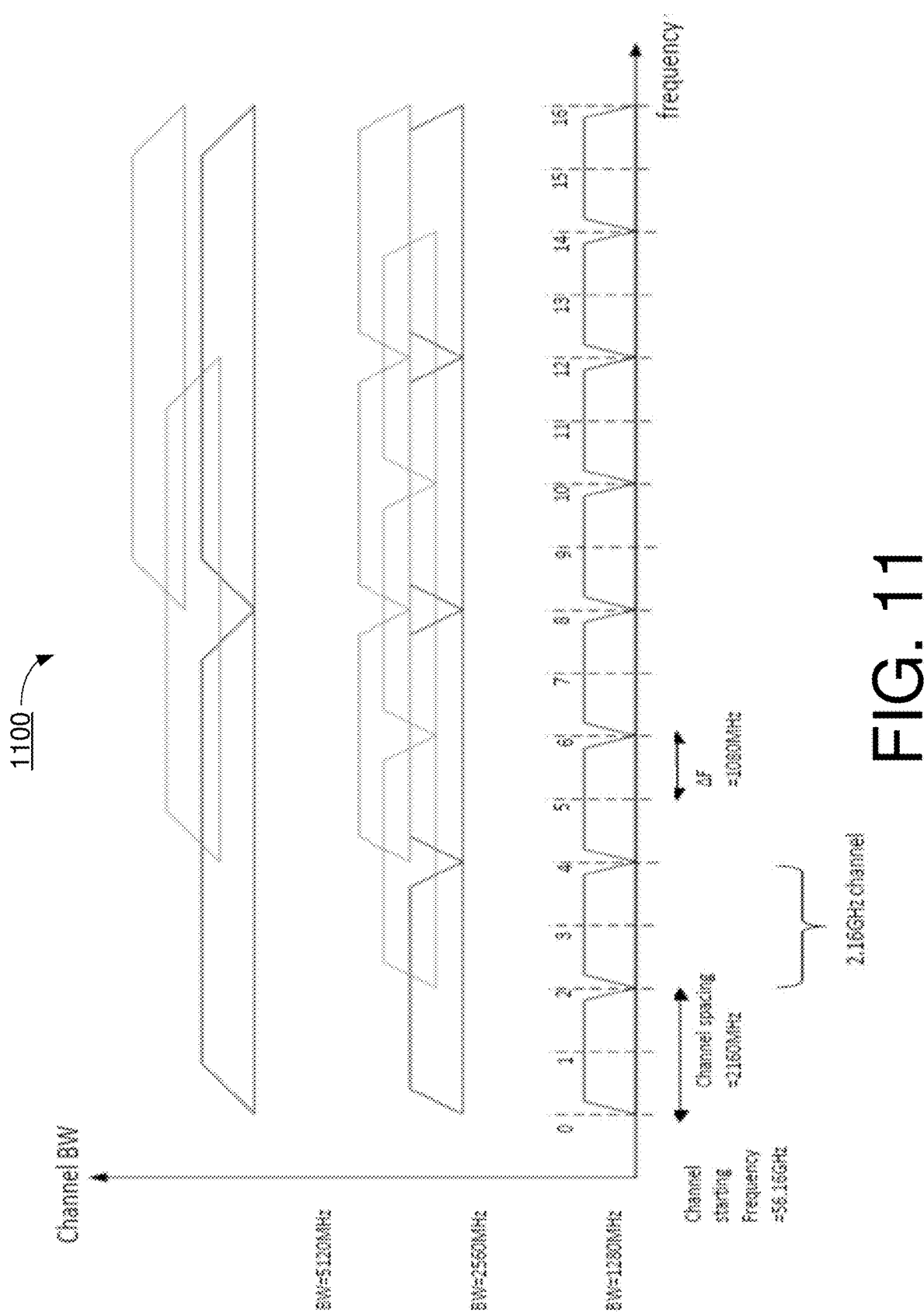
FIG. 11 is a diagram of an example design under a proposed scheme in accordance with the present disclosure.

FIG. 2 illustrates an example design 200 under a proposed scheme in accordance with the present disclosure. In design 200, channel spacing=360 MHz and bandwidth (BW)=320*n, with n=1, 2, 3, 4, 5, 6, . . . etc. FIG. 3 illustrates an example design 300 under a proposed scheme in accordance with the present disclosure. In design 300, channel spacing=360 MHz and BW=320*n, with n=1, 2, 3, 4, 6, . . . etc. FIG. 4 illustrates an example design 400 under a proposed scheme in accordance with the present disclosure. In design 400, channel spacing=360 MHz and any channel with a BW<2.16 GHz (or portion of a larger channel with BW<2.16 GHz) may not cross any 2.16 GHz channel boundary. FIG. 5 illustrates an example design 500 under a proposed scheme in accordance with the present disclosure. In design 500, channel spacing=540 MHz. FIG. 6 illustrates an example design 600 under a proposed scheme in accordance with the present disclosure. In design 600, channel spacing=540 MHz. FIG. 7 illustrates an example design 700 under a proposed scheme in accordance with the present disclosure. In design 700, channel spacing=720 MHz and BW=640*n, with n=1, 2, 3, 6, . . . etc. Alternatively, BW=320*n, with n=2, 4, 6, 12, . . . etc. FIG. 8 illustrates an example design 800 under a proposed scheme in accordance with the present disclosure. In design 800, channel spacing=1.08 GHz. FIG. 9 illustrates an example design 900 under a proposed scheme in accordance with the present disclosure. In design 900, channel spacing=1.08 GHz and BW=640*n, with n=1, 2, 4, . . . etc. Alternatively, BW=320*n, with n=2, 4, 8, . . . etc. FIG. 10 illustrates an example design 1000 under a proposed scheme in accordance with the present disclosure. In design 1000, channel spacing=2.16 GHz. FIG. 11 illustrates an example design 1100 under a proposed scheme in accordance with the present disclosure. In design 1100, channel spacing=2.16 GHz and BW=320*n, with n=4, 8, 16, . . . etc.

Under other proposed schemes in accordance with the present disclosure, channelization of 60 GHz for next-generation WLANs may reuse most legacy IEEE 802.11ac/ax/be system designs as much as possible such as, for example, tone plans, MCS and so on. Under these proposed schemes, channel starting frequency=56.16 GHz, ΔF is half of channel spacing (e.g., ΔF=channel spacing/2), and several channel spacing options may be considered. For instance, channel spacing options may include, for example and without limitation, 160 MHz, 320 Hz, 640 MHz and so on. Alternatively, channel spacing options may include 170 MHz, 340 MHz, 680 MHz and so on. Alternatively, channel spacing options may include 180 MHz, 360 MHz, 720 MHz and so on. Alternatively, channel spacing options may include 160 MHz+2*Gband, 320 MHz+2*Gband, 640 MHz+2*Gband, with Gband denoting a left-side or right-side guard band in unit of MHz. Alternatively, channel spacing options may include BW+2*Gband. Alternatively, channel spacing options may include BW+Gband_L+Gband_R, with Gband_L denoting the left-side guard band and Gband_R denoting the right-side guard band.

Figure 12:
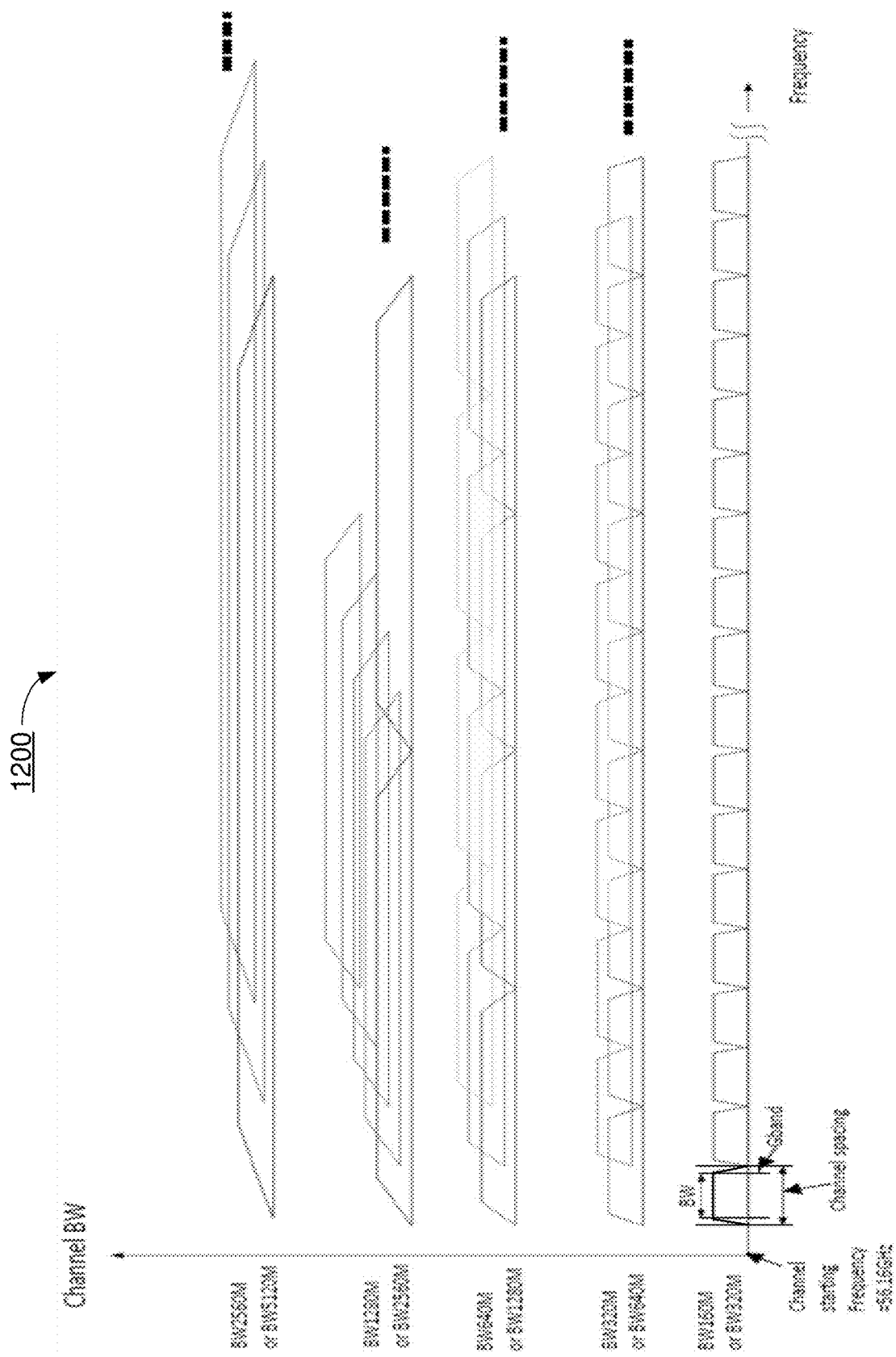
FIG. 12 is a diagram of an example design under a proposed scheme in accordance with the present disclosure.

Under a proposed scheme in accordance with the present disclosure, options of a channel bandwidth in the 60 GHz band may include 160 MHz, 320 Hz, 640 MHz, 1280 MHz, 2560 MHz and 5120 MHz. Moreover, under the proposed scheme, channel bonding and channel aggregation may be supported. For instance, channel bonding and channel aggregation may be 160 MHz+{160 MHz, 320 MHz, 640 MHz, etc}. Alternatively, or additionally, channel bonding and channel aggregation may be 320 MHz+{320 MHz, 640 MHz, 1280 MHz, etc}. Alternatively, or additionally, channel bonding and channel aggregation may be 640 MHz+{640 MHz, 1280 MHz, 2560 MHz, etc}. Alternatively, or additionally, channel bonding and channel aggregation may be 1280 MHz+{1280 MHz, 2560 MHz, 5120 MHz, etc}. Alternatively, or additionally, channel bonding and channel aggregation may be 2560 MHz+{2560 MHz, 5120 MHz, etc}. Alternatively, or additionally, channel bonding and channel aggregation may be 5120 MHz+{5120 MHz, etc}. Under the proposed scheme, the channel bonding and channel aggregation may be either contiguous or non-contiguous. Moreover, under the proposed scheme, the channel center frequency (in GHz) may be defined as follows: channel center frequency [GHz]=(channel starting frequency+ΔF)+ΔF×channelIndex. Here, channel starting frequency=56.16 GHz, ΔF is a half of channel spacing (e.g., ΔF=channel spacing/2), and channelIndex denotes a channel index value. FIG. 12 illustrates an example design 1200 showing various channelization designs under the proposed scheme for next-generation WLANs operating in the 60 GHz band.

Illustrative Implementations

Figure 13:
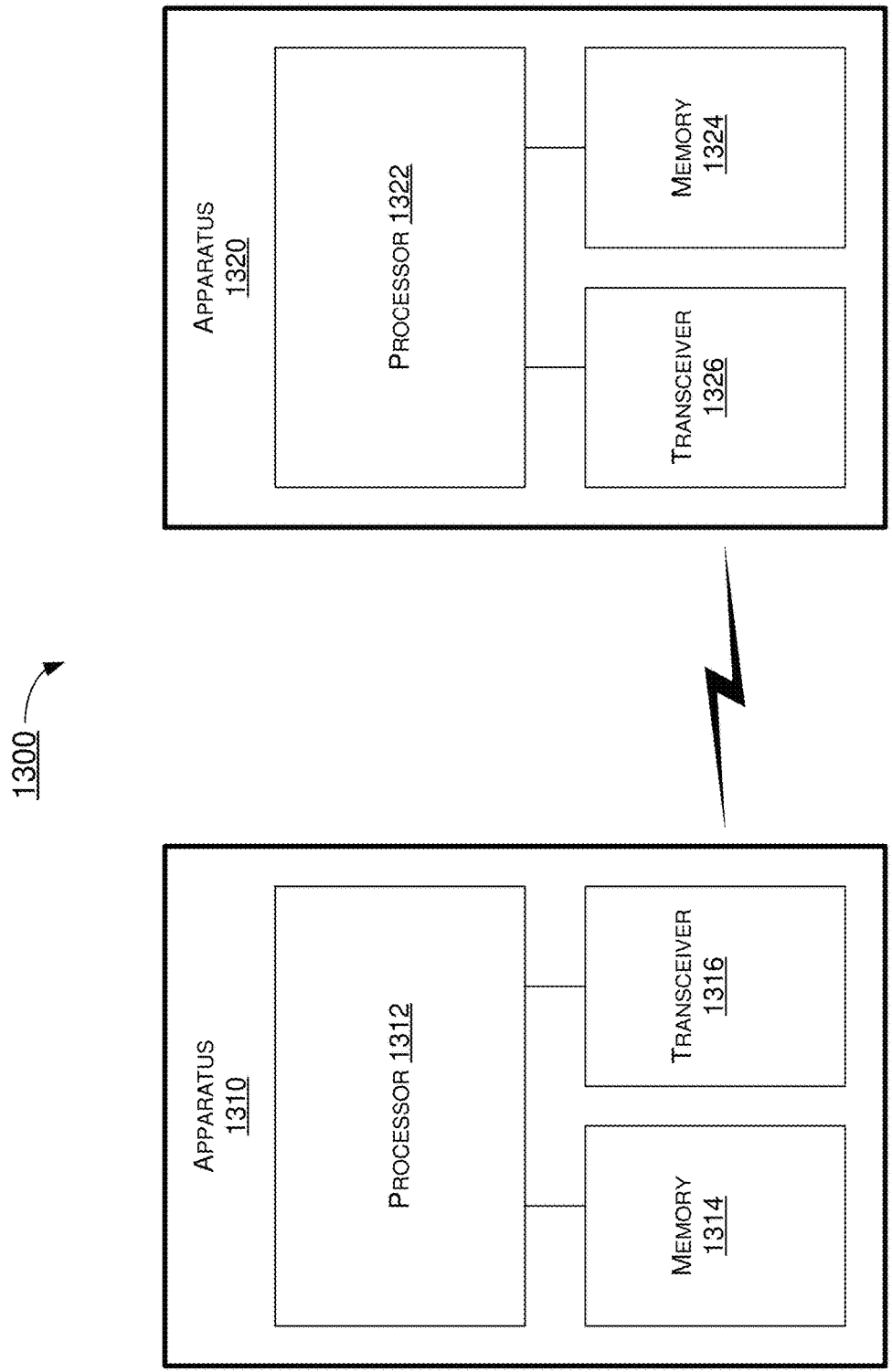
FIG. 13 is a block diagram of an example communication system in accordance with an implementation of the present disclosure.

FIG. 13 illustrates an example system 1300 having at least an example apparatus 1310 and an example apparatus 1320 in accordance with an implementation of the present disclosure. Each of apparatus 1310 and apparatus 1320 may perform various functions to implement schemes, techniques, processes and methods described herein pertaining to designs of channelization of the 60 GHz band for next-generation WLANs, including the various schemes described above with respect to various proposed designs, concepts, schemes, systems and methods described above as well as processes described below. For instance, apparatus 1310 may be implemented in STA 110 and apparatus 1320 may be implemented in STA 120, or vice versa.

Each of apparatus 1310 and apparatus 1320 may be a part of an electronic apparatus, which may be a non-AP STA or an AP STA, such as a portable or mobile apparatus, a wearable apparatus, a wireless communication apparatus or a computing apparatus. When implemented in a STA, each of apparatus 1310 and apparatus 1320 may be implemented in a smartphone, a smart watch, a personal digital assistant, a digital camera, or a computing equipment such as a tablet computer, a laptop computer or a notebook computer. Each of apparatus 1310 and apparatus 1320 may also be a part of a machine type apparatus, which may be an IoT apparatus such as an immobile or a stationary apparatus, a home apparatus, a wire communication apparatus or a computing apparatus. For instance, each of apparatus 1310 and apparatus 1320 may be implemented in a smart thermostat, a smart fridge, a smart door lock, a wireless speaker or a home control center. When implemented in or as a network apparatus, apparatus 1310 and/or apparatus 1320 may be implemented in a network node, such as an AP in a WLAN.

In some implementations, each of apparatus 1310 and apparatus 1320 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1310 and apparatus 1320 may be implemented in or as a STA or an AP. Each of apparatus 1310 and apparatus 1320 may include at least some of those components shown in FIG. 13 such as a processor 1312 and a processor 1322, respectively, for example. Each of apparatus 1310 and apparatus 1320 may further include one or more other components not pertinent to the proposed scheme of the present disclosure (e.g., internal power supply, display device and/or user interface device), and, thus, such component(s) of apparatus 1310 and apparatus 1320 are neither shown in FIG. 13 nor described below in the interest of simplicity and brevity.

In one aspect, each of processor 1312 and processor 1322 may be implemented in the form of one or more single-core processors, one or more multi-core processors, one or more RISC processors or one or more CISC processors. That is, even though a singular term "a processor" is used herein to refer to processor 1312 and processor 1322, each of processor 1312 and processor 1322 may include multiple processors in some implementations and a single processor in other implementations in accordance with the present disclosure. In another aspect, each of processor 1312 and processor 1322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1312 and processor 1322 is a special-purpose machine specifically designed, arranged and configured to perform specific tasks including those pertaining to designs of channelization of the 60 GHz band for next-generation WLANs in accordance with various implementations of the present disclosure.

In some implementations, apparatus 1310 may also include a transceiver 1316 coupled to processor 1312. Transceiver 1316 may include a transmitter capable of wirelessly transmitting and a receiver capable of wirelessly receiving data. In some implementations, apparatus 1320 may also include a transceiver 1326 coupled to processor 1322. Transceiver 1326 may include a transmitter capable of wirelessly transmitting and a receiver capable of wirelessly receiving data. It is noteworthy that, although transceiver 1316 and transceiver 1326 are illustrated as being external to and separate from processor 1312 and processor 1322, respectively, in some implementations, transceiver 1316 may be an integral part of processor 1312 as a system on chip (SoC), and transceiver 1326 may be an integral part of processor 1322 as a SoC.

In some implementations, apparatus 1310 may further include a memory 1314 coupled to processor 1312 and capable of being accessed by processor 1312 and storing data therein. In some implementations, apparatus 1320 may further include a memory 1324 coupled to processor 1322 and capable of being accessed by processor 1322 and storing data therein. Each of memory 1314 and memory 1324 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1314 and memory 1324 may include a type of read-only memory (ROM) such as mask ROM, programmable ROM (PROM), erasable programmable ROM (EPROM) and/or electrically erasable programmable ROM (EEPROM). Alternatively, or additionally, each of memory 1314 and memory 1324 may include a type of non-volatile random-access memory (NVRAM) such as flash memory, solid-state memory, ferroelectric RAM (FeRAM), magnetoresistive RAM (MRAM) and/or phase-change memory.

Each of apparatus 1310 and apparatus 1320 may be a communication entity capable of communicating with each other using various proposed schemes in accordance with the present disclosure. For illustrative purposes and without limitation, a description of capabilities of apparatus 1310, as STA 110, and apparatus 1320, as STA 120, is provided below. It is noteworthy that, although a detailed description of capabilities, functionalities and/or technical features of apparatus 1320 is provided below, the same may be applied to apparatus 1310 although a detailed description thereof is not provided solely in the interest of brevity. It is also noteworthy that, although the example implementations described below are provided in the context of WLAN, the same may be implemented in other types of networks.

Under various proposed schemes pertaining to designs of channelization of the 60 GHz band for next-generation WLANs in accordance with the present disclosure, with apparatus 1310 implemented in or as STA 110 and apparatus 1320 implemented in or as STA 120 in network environment 100, processor 1312 of apparatus 1310 may communicate, via transceiver 1316, in a 60 GHz band wirelessly with apparatus 1320 by either or both: (a) transmitting first data or first information to the second apparatus; and (b) receiving second data or second information from the second apparatus. In communicating in the 60 GHz band wirelessly, processor 1312 may communicate with a channelization design of the 60 GHz band having a channel center frequency being equal to (a channel starting frequency+ΔF)+ΔF*channelIndex, with ΔF denoting a half of a channel spacing and with channelIndex denoting a channel index value.

In some implementations, the channelization design of the 60 GHz band may involve a channelization of the 60 GHz band being aligned with an IEEE 802.11ad or IEEE 802.11ay channelization.

In some implementations, the channelization of the 60 GHz band may involve all channels with a bandwidth equal to or less than 2.16 GHz being within a 2.16 GHz channel range of the IEEE 802.11ad or IEEE 802.11ay channelization. Alternatively, or additionally, the channelization of the 60 GHz band may involve all channels with a bandwidth equal to or less than 4.32 GHz being within a 4.32 GHz channel range of the IEEE 802.11ad or IEEE 802.11ay channelization. Alternatively, or additionally, the channelization of the 60 GHz band may involve all channels with a bandwidth equal to or less than 6.48 GHz being within a 6.48 GHz channel range of the IEEE 802.11ad or IEEE 802.11ay channelization. Alternatively, or additionally, the channelization of the 60 GHz band may involve all channels with a bandwidth equal to or less than 8.64 GHz being within a 8.64 GHz channel range of the IEEE 802.11ad or IEEE 802.11ay channelization.

In some implementations, in communicating with the channelization design of the 60 GHz band, processor 1312 may communicate using a channel spacing of 2.16 GHz, 1.08 GHz, 0.72 GHz, 0.54 GHz, 0.36 GHz, 0.27 GHz, 0.24 GHz or 0.18 GHz.

In some implementations, the channel starting frequency may be 56.16 GHz. Correspondingly: (a) responsive to the channel spacing being 2.16 GHz, the channel index value may be one of 0, 1, 2, . . . , 16; (b) responsive to the channel spacing being 1.08 GHz, the channel index value may be one of 0, 1, 2, . . . , 32; (c) responsive to the channel spacing being 0.72 GHz, the channel index value may be one of 0, 1, 2, . . . , 48; (d) responsive to the channel spacing being 0.54 GHz, the channel index value may be one of 0, 1, 2, . . . , 64; (e) responsive to the channel spacing being 0.36 GHz, the channel index value may be one of 0, 1, 2, . . . , 96; (f) responsive to the channel spacing being 0.27 GHz, the channel index value may be one of 0, 1, 2, . . . , 128; and (g) responsive to the channel spacing being 0.24 GHz, the channel index value may be one of 0, 1, 2, . . . , 144.

In some implementations, the channelization design of the 60 GHz band may involve reuse of a channelization of the 60 GHz band being aligned with an IEEE 802.11ac, IEEE 802.11ax or IEEE 802.11be system design including either or both of a tone plan and an MCS.

In some implementations, options of a channel bandwidth in the 60 GHz band may include one or more of 80 MHz, 160 MHz, 320 Hz, 640 MHz, 1280 MHz, 2560 MHz and 5120 MHz. Moreover, channel bonding and channel aggregation under the channelization design may include one or more of the following: (a) 80 MHz+{80 MHz, 160 MHz, 320 MHz, 640 MHz}; (b) 160 MHz+{160 MHz, 320 MHz, 640 MHz}; (c) 320 MHz+{320 MHz, 640 MHz, 1280 MHz}; (d) 640 MHz+{640 MHz, 1280 MHz, 2560 MHz}; (e) 1280 MHz+{1280 MHz, 2560 MHz, 5120 MHz}; (f) 2560 MHz+{2560 MHz, 5120 MHz}; and (g) 5120 MHz+{5120 MHz}.

Illustrative Processes

FIG. 14 illustrates an example process 1400 in accordance with an implementation of the present disclosure. Process 1400 may represent an aspect of implementing various proposed designs, concepts, schemes, systems and methods described above. More specifically, process 1400 may represent an aspect of the proposed concepts and schemes pertaining to designs of channelization of the 60 GHz band for next-generation WLANs in accordance with the present disclosure. Process 1400 may include one or more operations, actions, or functions as illustrated by one or more of blocks 1410 as well as sub-blocks 1412 and 1414. Although illustrated as discrete blocks, various blocks of process 1400 may be divided into additional blocks, combined into fewer blocks, or eliminated, depending on the desired implementation. Moreover, the blocks/sub-blocks of process 1400 may be executed in the order shown in FIG. 14 or, alternatively in a different order. Furthermore, one or more of the blocks/sub-blocks of process 1400 may be executed repeatedly or iteratively. Process 1400 may be implemented by or in apparatus 1310 and apparatus 1320 as well as any variations thereof. Solely for illustrative purposes and without limiting the scope, process 1400 is described below in the context of apparatus 1310 implemented in or as STA 110 functioning as a non-AP STA and apparatus 1320 implemented in or as STA 120 functioning as an AP STA of a wireless network such as a WLAN in network environment 100 in accordance with one or more of IEEE 802.11 standards. Process 1400 may begin at block 1410.

At 1410, process 1400 may involve processor 1312 of apparatus 1310 communicating, via transceiver 1316, in a 60 GHz band wirelessly with apparatus 1320 by either or both: (a) transmitting first data or first information to the second apparatus; and (b) receiving second data or second information from the second apparatus. In communicating in the 60 GHz band wirelessly, process 1400 may involve processor 1312 communicating with a channelization design of the 60 GHz band having a channel center frequency being equal to (a channel starting frequency+ΔF)+ΔF*channelIndex, with ΔF denoting a half of a channel spacing and with channelIndex denoting a channel index value.

In some implementations, the channelization design of the 60 GHz band may involve a channelization of the 60 GHz band being aligned with an IEEE 802.11ad or IEEE 802.11ay channelization.

In some implementations, the channelization of the 60 GHz band may involve all channels with a bandwidth equal to or less than 2.16 GHz being within a 2.16 GHz channel range of the IEEE 802.11ad or IEEE 802.11ay channelization. Alternatively, or additionally, the channelization of the 60 GHz band may involve all channels with a bandwidth equal to or less than 4.32 GHz being within a 4.32 GHz channel range of the IEEE 802.11ad or IEEE 802.11ay channelization. Alternatively, or additionally, the channelization of the 60 GHz band may involve all channels with a bandwidth equal to or less than 6.48 GHz being within a 6.48 GHz channel range of the IEEE 802.11ad or IEEE 802.11ay channelization. Alternatively, or additionally, the channelization of the 60 GHz band may involve all channels with a bandwidth equal to or less than 8.64 GHz being within an 8.64 GHz channel range of the IEEE 802.11ad or IEEE 802.11ay channelization.

In some implementations, in communicating with the channelization design of the 60 GHz band, process 1400 may involve processor 1312 communicating using a channel spacing of 2.16 GHz, 1.08 GHz, 0.72 GHz, 0.54 GHz, 0.36 GHz, 0.27 GHz, 0.24 GHz or 0.18 GHz.

In some implementations, the channel starting frequency may be 56.16 GHz. Correspondingly: (a) responsive to the channel spacing being 2.16 GHz, the channel index value may be one of 0, 1, 2, ..., 16; (b) responsive to the channel spacing being 1.08 GHz, the channel index value may be one of 0, 1, 2, ..., 32; (c) responsive to the channel spacing being 0.72 GHz, the channel index value may be one of 0, 1, 2, ..., 48; (d) responsive to the channel spacing being 0.54 GHz, the channel index value may be one of 0, 1, 2, ..., 64; (e) responsive to the channel spacing being 0.36 GHz, the channel index value may be one of 0, 1, 2, ..., 96; (f) responsive to the channel spacing being 0.27 GHz, the channel index value may be one of 0, 1, 2, ..., 128; and (g) responsive to the channel spacing being 0.24 GHz, the channel index value may be one of 0, 1, 2, ..., 144.

In some implementations, the channelization design of the 60 GHz band may involve reuse of a channelization of the 60 GHz band being aligned with an IEEE 802.11ac, IEEE 802.11ax or IEEE 802.11be system design including either or both of a tone plan and an MCS.

In some implementations, options of a channel bandwidth in the 60 GHz band may include one or more of 80 MHz, 160 MHz, 320 Hz, 640 MHz, 1280 MHz, 2560 MHz and 5120 MHz. Moreover, channel bonding and channel aggregation under the channelization design may include one or more of the following: (a) 80 MHz+{80 MHz, 160 MHz, 320 MHz, 640 MHz}; (b) 160 MHz+{160 MHz, 320 MHz, 640 MHz}; (c) 320 MHz+{320 MHz, 640 MHz, 1280 MHz}; (d) 640 MHz+{640 MHz, 1280 MHz, 2560 MHz}; (e) 1280 MHz+{1280 MHz, 2560 MHz, 5120 MHz}; (f) 2560 MHz+{2560 MHz, 5120 MHz}; and (g) 5120 MHz+{5120 MHz}.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    communicating, by a processor of a first apparatus, in a 60 GHz band wirelessly with a second apparatus by either or both:
        transmitting first data or first information to the second apparatus; and
        receiving second data or second information from the second apparatus,
    wherein the communicating in the 60 GHz band wirelessly comprises communicating with a channelization design of the 60 GHz band having a channel center frequency being equal to (a channel starting frequency+ ΔF)+ΔF*channelIndex, and
wherein ΔF denotes a half of a channel spacing,
wherein channelIndex denotes a channel index value,
wherein the channel starting frequency is 56.16 GHz, and
wherein:
    responsive to the channel spacing being 2.16 GHz, the channel index value is one of 0, 1, 2, . . . 16;
    responsive to the channel spacing being 1.08 GHz, the channel index value is one of 0, 1, 2, . . . 32;
    responsive to the channel spacing being 0.72 GHz, the channel index value is one of 0, 1, 2 . . . 48;
    responsive to the channel spacing being 0.54 GHz, the channel index value is one of 0, 1, 2, . . . 64;
    responsive to the channel spacing being 0.36 GHz, the channel index value is one of 0, 1, 2, . . . 96;
    responsive to the channel spacing being 0.27 GHz, the channel index value is one of 0, 1, 2, . . . 128; and
    responsive to the channel spacing being 0.24 GHz, the channel index value is one of 0, 1, 2, . . . 144.

2. The method of claim 1, wherein the channelization design of the 60 GHz band comprises a channelization of the 60 GHz band being aligned with an Institute of Electrical and Electronics Engineers (IEEE) 802.11ad or IEEE 802.11ay channelization.

3. The method of claim 2, wherein the channelization of the 60 GHz band comprises all channels with a bandwidth equal to or less than 2.16 GHz being within a 2.16 GHz channel range of the IEEE 802.11ad or IEEE 802.11ay channelization.

4. The method of claim 2, wherein the channelization of the 60 GHz band comprises all channels with a bandwidth equal to or less than 4.32 GHz being within a 4.32 GHz channel range of the IEEE 802.11ad or IEEE 802.11ay channelization.

5. The method of claim 2, wherein the channelization of the 60 GHz band comprises all channels with a bandwidth equal to or less than 6.48 GHz being within a 6.48 GHz channel range of the IEEE 802.11ad or IEEE 802.11ay channelization.

6. The method of claim 2, wherein the channelization of the 60 GHz band comprises all channels with a bandwidth equal to or less than 8.64 GHz being within a 8.64 GHz channel range of the IEEE 802.11ad or IEEE 802.11ay channelization.

7. The method of claim 1, wherein the communicating with the channelization design of the 60 GHz band comprises communicating using a channel spacing of 2.16 GHZ, 1.08 GHz, 0.72 GHz, 0.54 GHz, 0.36 GHz, 0.27 GHz, 0.24 GHz or 0.18 GHz.

8. The method of claim 1, wherein the channelization design of the 60 GHz band comprises reuse of a channelization of the 60 GHz band being aligned with an Institute of Electrical and Electronics Engineers (IEEE) 802.11ac, IEEE 802.11ax or IEEE 802.11be system design including either or both of a tone plan and a modulation and coding scheme (MCS).

9. The method of claim 8, wherein options of a channel bandwidth in the 60 GHz band comprise one or more of 80 MHz, 160 MHz, 320 MHz, 640 MHz, 1280 MHz, 2560 MHz and 5120 MHz, and wherein channel bonding and channel aggregation under the channelization design comprises one or more of:
    80 MHz+{80 MHz, 160 MHz, 320 MHz, 640 MHz};
    160 MHz+{160 MHz, 320 MHz, 640 MHz};
    320 MHz+{320 MHz, 640 MHz, 1280 MHz};
    640 MHz+{640 MHz, 1280 MHz, 2560 MHz};
    1280 MHz+{1280 MHz, 2560 MHz, 5120 MHz};
    2560 MHz+{2560 MHz, 5120 MHz}; and
    5120 MHz+{5120 MHz}.

10. An apparatus, comprising:
    a transceiver configured to communicate wirelessly; and
    a processor coupled to the transceiver and configured to perform operations comprising:
        communicating, via the transceiver, in a 60 GHz band wirelessly with one other apparatus by either or both:
            transmitting first data or first information to the other apparatus; and
            receiving second data or second information from the other apparatus,
wherein, in communicating in the 60 GHz band wirelessly, the processor is configured to communicate with a channelization design of the 60 GHz band having a channel center frequency being equal to (a channel starting frequency+ΔF)+ΔF*channelIndex, and
wherein ΔF denotes a half of a channel spacing,
wherein channelIndex denotes a channel index value,
wherein the channelization design of the 60 GHz band comprises reuse of a channelization of the 60 GHz band being aligned with an Institute of Electrical and Electronics Engineers (IEEE) 802.11ac, IEEE 802.11ax or IEEE 802.11be system design including either or both of a tone plan and a modulation and coding scheme (MCS),
wherein options of a channel bandwidth in the 60 GHz band comprise one or more of 80 MHz, 160 MHz, 320 MHz, 640 MHz, 1280 MHz, 2560 MHz and 5120 MHz, and
wherein channel bonding and channel aggregation under the channelization design comprises one or more of:
    80 MHz+{80 MHz, 160 MHz, 320 MHz, 640 MHz};
    160 MHz+{160 MHz, 320 MHz, 640 MHz};
    320 MHz+{320 MHz, 640 MHz, 1280 MHz};
    640 MHz+{640 MHz, 1280 MHz, 2560 MHz};
    1280 MHz+{1280 MHz, 2560 MHz, 5120 MHz};
    2560 MHz+{2560 MHz, 5120 MHz}; and
    5120 MHz+{5120 MHz}.

11. The apparatus of claim 10, wherein the channelization design of the 60 GHz band comprises a channelization of the 60 GHz band being aligned with an Institute of Electrical and Electronics Engineers (IEEE) 802.11ad or IEEE 802.11ay channelization.

12. The apparatus of claim 11, wherein the channelization of the 60 GHz band comprises all channels with a bandwidth equal to or less than 2.16 GHz being within a 2.16 GHz channel range of the IEEE 802.11ad or IEEE 802.11ay channelization.

13. The apparatus of claim 11, wherein the channelization of the 60 GHz band comprises all channels with a bandwidth equal to or less than 4.32 GHz being within a 4.32 GHz channel range of the IEEE 802.11ad or IEEE 802.11ay channelization.

14. The apparatus of claim 11, wherein the channelization of the 60 GHz band comprises all channels with a bandwidth equal to or less than 6.48 GHz being within a 6.48 GHz channel range of the IEEE 802.11ad or IEEE 802.11ay channelization.

15. The apparatus of claim 11, wherein the channelization of the 60 GHz band comprises all channels with a bandwidth equal to or less than 8.64 GHz being within a 8.64 GHz channel range of the IEEE 802.11ad or IEEE 802.11ay channelization.

16. The apparatus of claim 10, wherein the communicating with the channelization design of the 60 GHz band comprises communicating using a channel spacing of 2.16 GHz, 1.08 GHz, 0.72 GHz, 0.54 GHz, 0.36 GHz, 0.27 GHz, 0.24 GHz or 0.18 GHz.

17. The apparatus of claim 10, wherein the channel starting frequency is 56.16 GHz, and wherein:
    responsive to the channel spacing being 2.16 GHZ, the channel index value is one of 0, 1, 2, . . . , 16;
    responsive to the channel spacing being 1.08 GHz, the channel index value is one of 0, 1, 2, . . . , 32;
    responsive to the channel spacing being 0.72 GHz, the channel index value is one of 0, 1, 2, . . . , 48;
    responsive to the channel spacing being 0.54 GHz, the channel index value is one of 0, 1, 2, . . . , 64;
    responsive to the channel spacing being 0.36 GHz, the channel index value is one of 0, 1, 2, . . . , 96;
    responsive to the channel spacing being 0.27 GHz, the channel index value is one of 0, 1, 2, . . . , 128; and
    responsive to the channel spacing being 0.24 GHz, the channel index value is one of 0, 1, 2, . . . , 144.

\* \* \* \* \*